United States Patent [19]

Uchida et al.

[11] Patent Number: 4,824,183
[45] Date of Patent: Apr. 25, 1989

[54] DUAL-CIRCUIT HYDRAULIC ANTI-LOCK BRAKING SYSTEM

[75] Inventors: Kiyoyuki Uchida; Michio Akiyoshi; Yoshiaki Tsuchiya, all of Susono, Japan

[73] Assignee: Toyota Jidosha Kabushiki Kaisha, Aichi, Japan

[21] Appl. No.: 182,214

[22] Filed: Apr. 15, 1988

[30] Foreign Application Priority Data

Apr. 21, 1987 [JP] Japan ................................ 62-97986

[51] Int. Cl.$^4$ .............................................. B60T 8/88
[52] U.S. Cl. ............................... 303/92; 303/DIG. 3; 303/DIG. 4; 303/119; 364/426.02
[58] Field of Search .................. 303/92, 20, DIG. 1–4, 303/100, 95–98, 103–119, 68; 364/426; 188/181 A

[56] References Cited

U.S. PATENT DOCUMENTS

| | | | |
|---|---|---|---|
| 3,883,184 | 5/1975 | Jonner et al. | 303/92 |
| 3,907,380 | 9/1975 | Fleischer et al. | 303/92 |
| 4,205,884 | 6/1980 | Miyakawa et al. | 303/92 |
| 4,264,111 | 4/1981 | Shimizu et al. | 303/92 X |
| 4,270,809 | 6/1981 | Ohmori et al. | 303/92 |
| 4,668,023 | 5/1987 | Every et al. | 303/DIG. 4 |
| 4,736,992 | 4/1988 | Hendrickson | 303/92 |

FOREIGN PATENT DOCUMENTS 5826661  8/1981  Japan .

Primary Examiner—Douglas C. Butler
Attorney, Agent, or Firm—Parkhurst, Oliff & Berridge

[57] ABSTRACT

A dual-circuit hydraulic anti-lock braking system for an automotive vehicle having a first and a second group of wheels, including (a) a dual-circuit hydraulic braking device including a first and a second brake circuit which are independent of each other, (b) a wheel rotating condition detecting device; (c) a vehicle running condition detecting device; (d) a regulating device for regulating each of a first and second braking pressures transmitted by the first and second brake circuits, respectively, by decreasing or increasing the braking pressure for a duration of time, when the detected rotating condition of at least one wheel of each of the first and second wheel groups is brought into a predetermined relationship with the detected running condition of the vehicle so as to apply the regulated pressure to a brake cylinder associated with the wheel whose detected rotating condition is brought into the predetermined relationship with the detected running condition of the vehicle. The system further including (e) a failure detecting device for detecting a failure of each of the first and second brake circuits; and (f) a time setting device for determining the duration of time at a first value when no failure is detected, and at a second value different from the first time value when a failure is detected.

10 Claims, 8 Drawing Sheets

DUAL-CIRCUIT HYDRAULIC ANTI-LOCK BRAKING SYSTEM

BACKGROUND OF THE INVENTION

1. Field of the Invention

The present invention relates to a dual-circuit hydraulic anti-lock braking system for automotive vehicles, adapted to perform improved anti-lock braking pressure regulation when one of a pair of brake circuits of the dual-circuit hydraulic braking device of the system is functionally lost.

2. Discussion of the Prior Art

A dual-circuit hydraulic braking device is widely used in a motor vehicle which has a pair of groups of wheels. This type of braking device includes a pair of hydraulic brake circuits which are hydraulically independent of each other. One brake circuit is adapted to establish a braking pressure to be applied to a brake cylinder provided for each wheel of a corresponding one of the two wheel groups of the vehicle, while the other brake circuit is adapted to establish another independent braking pressure to be applied to a brake cylinder provided for each wheel of the other wheel group.

It has been known in the art of hydraulic braking devices that, when the braking pressure applied to the wheel brake cylinder for applying brake to the vehicle becomes excessively high in relation to the coefficient of friction of the road surface on which the vehicle is running, a slip amount or rate of the wheel becomes excessively high, which results in an increased braking distance and/or a lowered vehicle running stability. Laid-open Publication No. 58-26661 (published on Feb. 17, 1983) of Japanese Patent Application discloses an anti-lock braking device which is adapted to automatically regulate braking pressure so as to prevent the above-indicated problem.

The above-identified anti-lock braking system includes (a) wheel rotating condition detecting means; (b) vehicle running condition detecting means; and (c) a braking pressure regulating device. The wheel rotating condition detecting means is adapted to detect a rotating condition of at least one wheel of each of the two wheel groups, for example, a rotating speed of the wheel and/or a deceleration rate of the rotating speed of the same, while the vehicle running condition detecting means detects a running condition of the vehicle, for example, a running speed of the vehicle and/or a deceleration rate of the running speed of the same. For example, the vehicle running condition detecting means is constituted by means for presuming the vehicle running speed based on the highest one of the wheel rotating speeds detected by wheel rotating speed detecting means, one of the wheel rotating condition detecting means, and means for calculating the deceleration rate thereof based on the vehicle running speed. Alternatively, the vehicle running condition detecting means is constituted by means for detecting the vehicle running speed and/or the deceleration rate thereof based on detected timewise variation of the roughness or optical image of the road surface on which the vehicle is running. Further, it is disclosed by the above-indicated patent document that the deceleration rate of the vehicle can be detected by an accelerometer fixed to the body of the vehicle. The disclosed braking pressure regulating device, which is adapted to increase and decrease the brake fluid pressure applied to the wheel brake cylinder, initiates the pressure-increasing or pressure-decreasing operation at the moment when the detected wheel rotating speed, deceleration rate or other wheel rotating condition is brought into a predetermined relatioship with the detected vehicle running speed, vehicle deceleration rate or other vehicle running condition, and terminates it when the detected wheel rotating condition is brought into another predetermined condition or state. Usually, at least one of the pressure-increasing and pressure-decreasing operations conducted by the braking pressure regulating device is specified such that it is conducted for a predetermined duration of time from the initiation thereof, that is, it is terminated with passage of the predetermined duration of time. For example, the pressure-decreasing operation is initiated by the regulating device when the actual rotating speed of one of the wheels of the vehicle becomes lower than a target wheel speed which is determined by subtracting a predetermined value indicative of a suitable amount of slip, from the actual vehicle running speed (or which is determined so as to permit the wheel to exhibit a suitable rate of slip), and terminated with passage of a predetermined duration of time. The braking pressure regulating device is capable of performing the pressure-increasing operation in a manner similar to the manner in which to perform the pressure-decreasing operation described above, and further capable of performing both the pressure-increasing and pressure-decreasing operations in that manner.

It is also known that conventional dual-circuit hydraulic anti-lock braking devices suffer from a problem that, in the event of a failure of one of the two hydraulic brake circuits of the device, i.e., when one of the two independent braking pressures is no longer applied to the wheel brake cylinder or cylinders by a corresponding one of the two brake circuits due to its breakage, for example, the other braking pressure transmitted by the other, normally functioning brake circuit, becomes difficult to be appropriately regulated.

Where the pressure-increasing or pressure-decreasing operation is conducted by the braking pressure regulating device for regulating braking pressure for a predetermined duration of time, an amount of increase or decrease of the braking pressure varies depending upon a pressure level of the braking pressure at that time. Because a total braking force of the vehicle is reduced in the event of such a one-circuit failure, a pressure level of the braking pressure transmitted by the normally functioning brake circuit, at the moment when the rotating condition of one wheel of the corresponding wheel group is brought into a predetermined relationship with the vehicle running condition, is different from that of the same at a comparable moment in the case where both the two circuits are normal. For example, in the event of the one-circuit failure a smaller amount of movement of load is produced in a vehicle as a result of applying brake to the vehicle, as compared with when the two brake circuits are normal. Consequently, a smaller and a larger load are exerted to the front and rear wheels of the vehicle, respectively, as compared with when the two circuits are normal, whereby the brake cylinders for the front wheels are subject to a lower braking pressure and the brake cylinders for the rear wheels are subject to a higher braking pressure, at the moment when each wheel is brought into skidding condition.

The Assignee of the present application, in Japanese Patent Application No. 61-222749 (and corresponding U.S. patent application Ser. No. 099,239), has proposed to alter the pressure-reducing time during which the braking pressure is reduced by the braking pressure regulating device, according to the level of the actual deceleration rate of the vehicle (that is, level of the braking pressure) at the time of initiation of the pressure-reducing operation. However, the deceleration rate of the vehicle is varied when one of the two hydraulic brake circuits fails or is functionally lost, more specifically, the vehicle deceleration rate is reduced in the event of the one-circuit failure, as compared with when both the two circuit is normal.

The conventional dual-circuit hydraulic anti-lock braking devices are adapted such that the common pressure-regulating time during which the braking pressure is increased or decreased is used between the case where the two brake circuits are normal and the case where one of the two circuits is functionally lost, whereby the braking pressure is not suitably regulated in the event of the one-circuit failure. Thus, the anti-lock braking pressure regulation conducted by the conventional devices has been unsatisfactory.

SUMMARY OF THE INVENTION

It is therefore an object of the present invention to provide a dual-circuit hydraulic anti-lock braking system which is capable of adequately effecting anti-lock braking-pressure regulation even in the event of a failure of one of the two brake circuits, by using different time-durations during which the braking pressure applied to the wheel brake cylinder or cylinders is increased or decreased, between in the case where both of the two brake circuits normally function and in the case of the one-circuit failure.

The above object may be obtained according to the principle of the present invention, which provides a dual-circuit hydraulic anti-lock braking system for an automotive vehicle having a first wheel group including at least one wheel and a second wheel group including at least one wheel different from the at least one wheel of the first wheel group. The system includes (i) a dual-circuit hydraulic braking device including a first and a second hydraulic brake circuit which are hydraulically independent of each other, the first hydraulic brake circuit comprising (a) a first brake cylinder group including at least one brake cylinder for applying brake to a corresponding wheel of the first wheel group, (b) a first pressure source for producing a first braking pressure, and (c) a first fluid passage group including at least one fluid passage for transmitting the first braking pressure from the first pressure source to a corresponding brake cylinder of the first brake cylinder group, the second hydraulic brake circuit comprising (d) a second brake cylinder group including at least one brake cylinder for applying brake to a corresponding wheel of the second wheel group, (e) a second pressure source for producing a second braking pressure which is hydraulically independent of the first braking pressure, and (f) a second fluid passage group including at least one fluid passage for transmitting the second braking pressure from the second pressure source to a corresponding brake cylinder of the second brake cylinder group; (ii) wheel rotating condition detecting means for detecting a rotating condition of at least one wheel of each of the first and second wheel groups; (iii) vehicle running condition detecting means for detecting a running condition of the automotive vehicle; (iv) braking pressure regulating means for regulating, when the detected rotating condition of the at least one wheel of each of the first and second wheel groups is brought into a predetermined relationship with the detected running condition of the automotive vehicle, each of the first and second braking pressures to apply the reguated pressure to one of the brake cylinders which corresponds to the wheel whose detected rotating condition has been brought into the predetermined relationship, the braking pressure regulating means conducting at least one of pressure-increasing and pressure-decreasing operations for a duration of time for regulating each braking pressure; (v) failure detecting means for detecting that each of the first and second hydraulic brake circuits has failed; and (vi) time setting means for determining the duration of time at a first duration value when the failure of any one of the first and second hydraulic brake circuits is not detected by the failure detecting means, while determining the duration of time at a second duration value different from the first time value when the failure is detected.

In the dual-circuit hydraulic anti-lock braking system constructed as described above, upon detection of a failure of one of the two brake circuits by the failure detecting means, the time setting means determines the pressure-regulating time during which the braking pressure is increased or decreased, at a second duration value different from a first time value which is used as the pressure-regulating time for the case where no failure is detected, i.e. both the two brake circuits are normal.

Thus, since even in the event of the one-circuit failure the braking pressure transmitted by the other, normal circuit is suitably regulated, a slip amount or rate of the wheel or wheels subjected to braking action by the corresponding brake cylinder or cylinders, is held at an appropriate level. In this way, the present anti-lock braking system greatly contributes to improving running stability of the vehicle in the event of the one-circuit failure and shortening the braking distance of the vehicle in that event, as compared with the conventional anti-lock braking devices.

For achieving the above-indicated object, the instant anti-lock braking system incorporates the failure detecting means and the time setting means, each of which may be provided at comparatively low cost. This leads to holding as low as possible an overall manufacturing cost of the instant system offering the advantages indicated above.

In one embodiment of the invention, the failure detecting means comprises timer means for measuring a time lapse from initiation of a preceding first-time pressure-decreasing operation of the braking pressure regulating means for decreasing one of the first and second braking pressures; and judging means for checking, based on the time lapse measured by the timer means, whether or not the braking pressure regulating means has initiated a succeeding first-time pressure-decreasing operation for decreasing the other of the first and second braking pressures, within a predetermined period of time after the initiation of the preceding first-time pressure-decreasing operation, the judging means judging that one of the first and second hydraulic brake circuits which corresponds to the other of the first and second braking pressures has failed, if the checking is found to be negative. In this case, the time setting means may be adapted to restore the duration of time from the second duration value to the first duration value, when the succeeding first-time pressure-decreasing operation has been initiated by the braking pressure regulating means, even after the judging means has judged that the other of the first and second hydraulic brake circuits failed.

In another embodiment of the invention, the wheels of the first and second wheel groups include at least one wheel and at least one rear wheel, and the time setting means determines the second duration value, in the case where the detected rotating condition of the at least one front wheel is brought into the predetermined relationship, such that the second duration value is larger than the first duration value, and, in the case where the detected rotating condition of the at least one rear wheel is brought into the predetermined relationship, such that the second duration value is smaller than the first duration value.

In yet another embodiment of the invention, the wheel rotating condition detecting means comprises wheel rotating speed detecting means for detecting a rotating speed of the at least one wheel of each of the first and second wheel groups, the vehicle running condition detecting means comprising vehicle running speed presuming means for presuming that the running speed of the automotive vehicle is represented by a highest one of the wheel rotating speeds detected by the wheel rotating speed detecting means, the predetermined relationship being that the detected rotating speed of the at least one wheel of each of the first and second wheel groups becomes lower than the presumed running speed of the automotive vehicle by a preset speed difference. In this case, the braking system may further comprise speed difference setting means for determining the speed difference at a first speed difference value when the failure of any one of the first and second hydraulic brake circuits is not detected by the failure detecting means, while determining the speed difference at a second speed difference value greater than the first speed difference value when the failure is detected. It is also preferred that the braking pressure regulating means be adapted to conduct the pressure-decreasing operation for decreasing each of the first and second braking pressures for the duration of time.

In the above-indicated embodiment of the invention, the vehicle running condition detecting means may further comprise calculator means for calculating a deceleration rate of the presumed running speed of the automotive vehicle. In this case, the time setting means comprises a first pressure-reducing-time table representing a relationship in which a plurality of time values indicative of the first duration value correspond to a plurality of successive ranges of the calculated deceleration rate of the automotive vehicle, and a second pressure-reducing-time table representing a relationship in which a plurality of time values indicative of the second duration value correspond to a plurality of successive ragnes of the calculated deceleration rate of the automotive vehicle, the time setting means determining the duration of time according to the first pressure-reducing-time table when the failure of any one of the first and second hydraulic brake circuits is not detected by the failure detecting means, while determining the duration of time according to the second pressure-reducing-time table when the failure is detected.

In a further embodiment of the invention, the failure detecting means comprises pressure difference detecting means for detecting a pressure difference between the first and second braking pressures before the first and second braking pressures are regulated by the braking pressure regulating means, and judging means for checking whether or not the detected pressure difference has exceeded a predetermined pressure difference value, the judging means judging that one of the first and second hydraulic brake circuits has failed, if the checking is found to be affirmative.

BRIEF DESCRIPTION OF THE DRAWINGS

The above and optional objects, features and advantages of the present invention will be better understood by reading the following detailed description of a presently preferred embodiment of the invention, when considered in conjunction with the accompanying drawings, in which.

DETAILED DESCRIPTION OF THE PREFERRED EMBODIMENT

Figure 1:
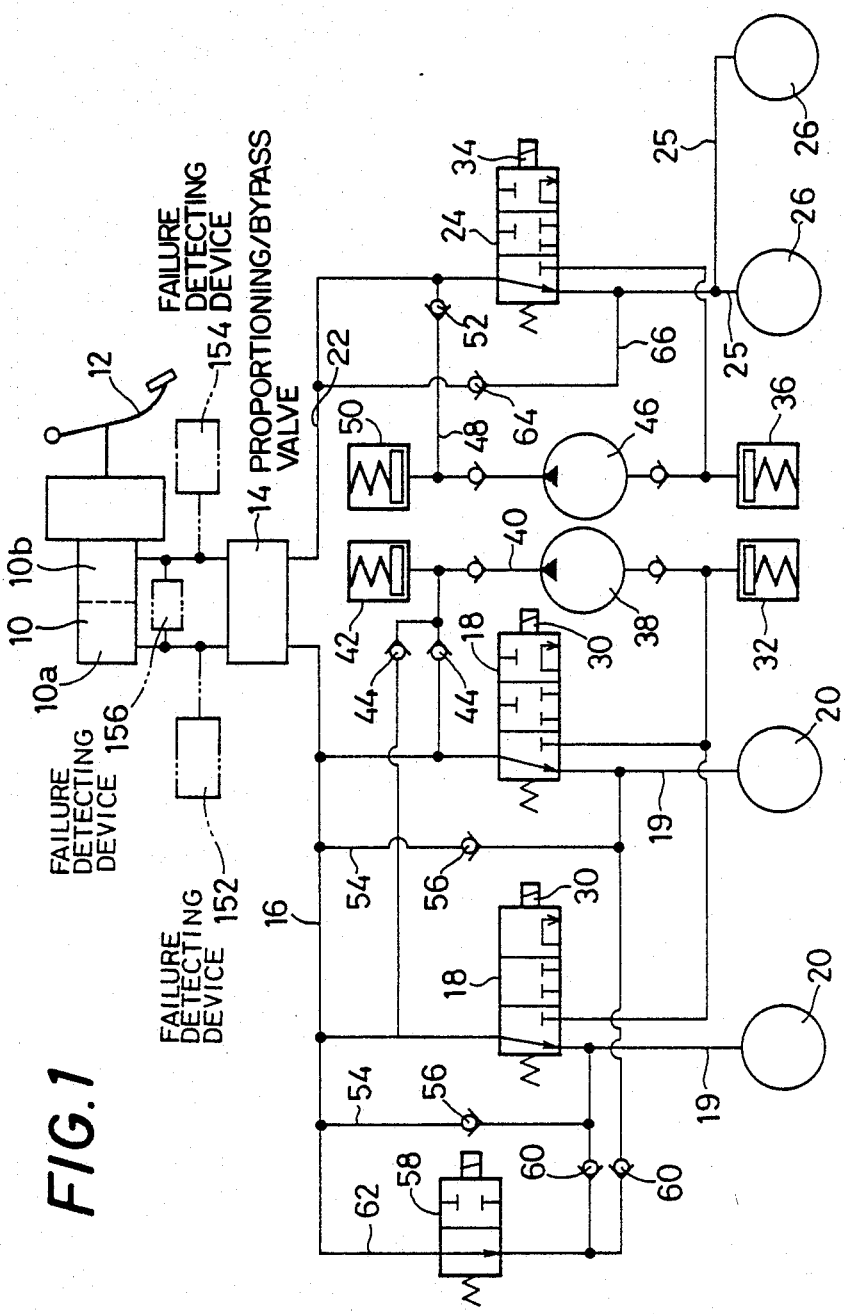
FIG. 1 is a schematic diagram of one embodiment of a dual-circuit hydraulic anti-lock braking system of the present invention for an automotive vehicle.
Figure 2:
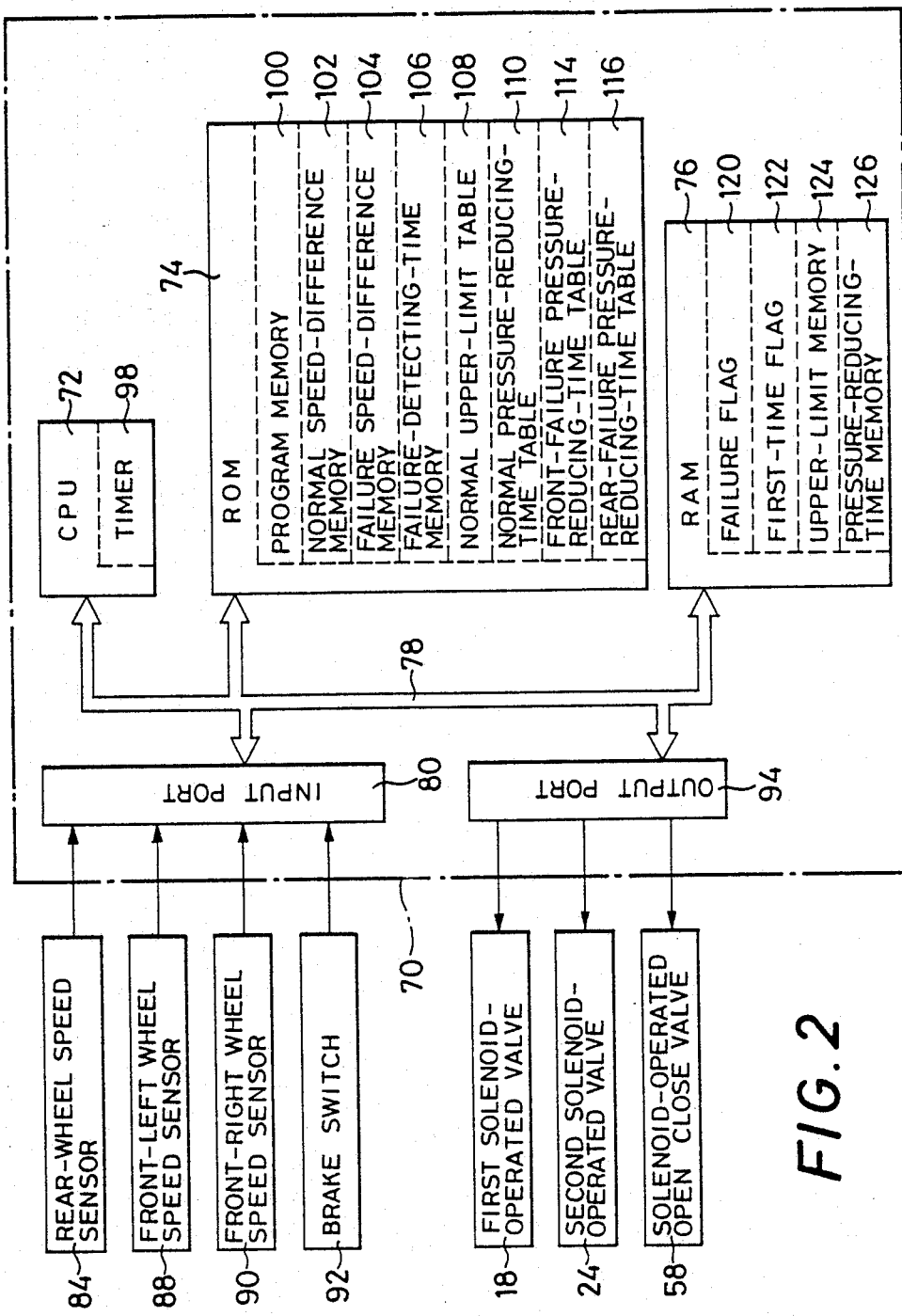
FIG. 2 is a block diagram illustrating a control device employed in the anti-lock braking system of FIG. 1.

Referring to FIG. 1, there is shown one embodiment of a dual-circuit hydraulic anti-lock braking system of the present invention, applied to a four wheel automotive vehicle of a front-engine/rear-drive type. The anti-lock braking system has a dual-circuit hydraulic braking device including a pair of brake circuits which are hydraulically indepedent of each other.

In FIG. 1, reference numeral 10 designates a master cylinder defining a pair of pressure sources in the form of a first and a second pressure chambers 10a, 10b which are independent of each other. Upon depression by a driver's foot of a brake pedal 12 located in the passenger's room of the vehicle, the first and second pressure chambers 10a, 10b of the master cylinder 10 produce a first and a second independent braking pressures, respectively, whose levels at this stage are in proportion to the depressing force exerted by the driver to the brake pedal 12. The thus-produced first braking pressure is transmitted to a first main fluid passage 16 via a proportioning/bypass valve 14. The first main fluid passage 16 is bifurcated into a pair of secondary fluid passages which are connected to a front-right and a front-left brake cylinder 20, 20 via a right and a left first solenoid-operated directional valve 18, 18 and a right and a left first end fluid passage 19, 19, respectively. The second braking pressure from the second pressure chamber 10b is transmitted to a second main fluid passage 22 via the proportioning/bypass valve 14. The second main fluid passage 22 is provided with a second solenoid-operated directional valve 24 and, downstream of the second valve 24, is bifurcated into a right and a left second end fluid passage 25, 25 which are connected to a rear-right and a rear-left brake cylinder 26, 26, respectively. The two front wheel brake cylinders 20, 20 serve for applying brake to the vehicle by restraining rotating movement of a front-right and a front-left wheel of the vehicle, respectively, while the rear-right and rear-left brake cylinders 26, 26 serve for the same purpose by restraining rotating movement of a rear-right and a rear-left wheel of the vehicle, respectively. It is understood from the foregoing that the instant hydraulic braking device is of the so-called "front/rear" dual-circuit type. The two first end fluid passages 19, 19 and common first main fluid passage 16 constitute a front (first) fluid passage group, while the two second end fluid passages 25, 25 and common second main fluid passage 22 constitute a rear (second) fluid passage group. The two front brake cylinders 20, 20 constitute a front (first) brake cylinder group, while the two rear brake cylinders 26, 26 constitute a rear (second) brake cylinder group. The two front wheels constitute a front (first) wheel group, while the two rear wheels constitute a rear (second) wheel group. The first pressure chamber 10a of the master cylinder 10, first fluid passage group, two first directional valves 18, two front wheel brake cylinders 20, 20, and other members cooperate with each other to constitute the front (first) hydraulic brake circuit of the dual-circuit braking device, while the second pressure chamber 10b, second fluid passage group, second directional valve 24, two rear-wheel brake cylinders 26, and other members cooperate with each other to constitute the rear (second) brake circuit.

The proportioning/bypass valve 14 is adapted such that, when the front circuit normally functions or operates, the valve 14 transmits the received second braking pressure having a pressure under a predetermined level, without modifying it, from upstream to downstream, namely, from the side of the second pressure chamber 10b to the side of the rear brake cylinders 26 and on the other hand modifies the received second pressure having a pressure above the predetermined level by proportionally reducing it so as to produce the proportionally reduced second braking pressure, and that, when the front circuit is functionally lost, the valve 14 constantly transmits the second braking pressure, without modifying it, irrespective of the pressure level of the second pressure.

Each of the first directional valves 18 is operable in three modes, that is, pressure-reduce mode, pressure-hold mode and pressure-increase mode. The valves 18 shown in FIG. 1 are in their pressure-increase mode in which the valves 18 allow the first pressure chamber 10a of the master cylinder 10 to hydraulically communicate with the front wheel brake cylinders 20, thereby permitting the fluid pressures of brake fluid in the cylinders 20 to be increased. Each valve 18 is placed in its pressure-reduce mode upon energization of an associated solenoid 30 with a comparatively high electric current. Each valve 18 in its pressure-reduce mode interrupts the fluid communication between the master cylinder 10 and the corresponding brake cylinder 20 and concurrently allows the brake cylinder 20 in question to fluid communicate with a first fluid reservoir 32, thereby permitting the fluid pressure in the corresponding brake cylinder 20. Upon energization of the solenoid 30 with a comparatively low electric current, each valve 18 is placed in its pressure-hold mode in which the valve 18 interrupts both the fluid communications between the corresponding brake cylinder 20 and the master cylinder 10 and between the cylinder 20 and the fluid reservoir 32, thereby maintaining a pressure level of the fluid pressure in the cylinder 20. Similar to the first directional valves 18, the second directioanl valve 24 is operable in its pressure-increase, pressure-hold and pressure-reduce modes, depending upon three energization states of an associated solenoid 34, which has the same function as that of each solenoid 30. Accordingly, description about the three operation modes of the second directional valve 24 is omitted.

The brake fluid stored in the reservoir 32 is pumped by a first pump 38 to be returned via a first pump passage 40 to the first main fluid passage 16 (or two secondary fluid passages bifurcated therefrom). The first pump passage 40 is provided with a damper 42 for damping pressure pulsation of the brake fluid due to the pumping action of the pump 38, and a pair of check valves 44 for blocking flowing of the brake fluid from the side of the first main fluid passage 16 to the side of the damper 42. Similar to the front hydraulic braking circuit, the rear circuit is provided with a second pump 46, a second pump passage 48, a damper 50 and a check valve 52 all of which have the same functions as those of corresponding elements of the front circuit, respectively.

The front circuit further includes a pair of first return passages 54 which permit the brake fluid to be returned from the side of the respective brake cylinders 20 to the side of the master cylinder 10 by bypassing the respective first directional valves 18. Each of the first return passages 54 is provided with a check valve 56 for preventing the brake fluid from flowing from the side of the master cylinder 10 to the side of the corresponding brake cylinder 20. The front circuit futher includes a bypass passage 62 provided with a solenoid-operated open/close valve 58 which is normally open, and a pair of check valves 60 for checking flowing of the brake fluid from the side of the respective cylinders 20 to the side of the master cylinder 10 and allowing the brake fluid to flow in the reverse direction. In order to increase the fluid pressures of the brake fluid in the front brake cylinders 20, a sufficient amount of brake fluid is fed to the cylinders 20 from the master cylinder 10 via both the respective first directional valves 18 and the open/close valve 58. The rear circuit includes a second return passage 66 provided with a check valve 64, similar to the front circuit, however, the rear circuit has no bypass passage comparable with the passage 62 of the front circuit.

Figure 3:
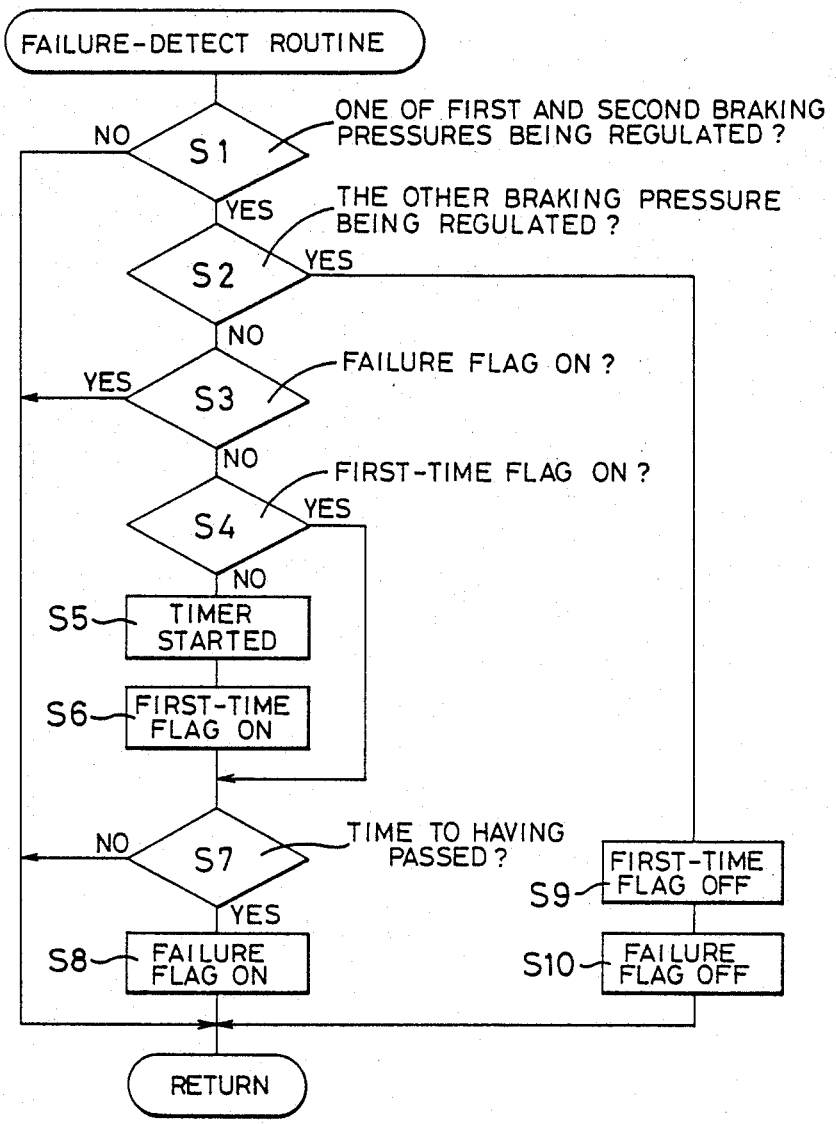
FIG. 3 is a flow chart representing a failure-detect routine effected for detecting a failure of one of the two brake circuits of a dual-circuit hydraulic braking device of the system of FIG. 1, the flow chart constituting a part of a control program stored in a program memory of a computer of the control device of FIG. 2.

A control device 70, shown in FIG. 3, controls the mode-selecting operations for the first and second directional valves 18, 24 and the open/close valve 58, independently of each other. The control device 70 is mainly constituted by a computer which includes a central processing unit (CPU) 72, a read-only memory (ROM) 74, a random-access memory (RAM) 76, and a bus 78 for connecting the elements 72, 74, 76 to each other. The bus 78 connects the CPU 26 to an input port 80 which is coupled to (a) a rear wheel rotating speed sensor 84 adapted to detect an average rotating speed of the two rear wheels based on a rotating speed of an associated propellar shaft of the vehicle; (b) a right and a left front wheel speed sensor 88, 90 adapted to detect a rotating speed of the front-right and front-left wheels, respectively; and (c) a brake switch 92 adapted to detect a depression of the brake pedal 12 by the driver's foot. The bus 78 further connects the CPU 72 to an output port 94 which is coupled to the first and second directional valves 18, 24 and the open/close valve 58.

The CPU 72 has a timer 98, the function of which will be described hereinafter. The ROM 74 has a program memory 100 which stores a program for effecting a failure-detect routine shown in the flow chart of FIG. 3, a program for effecting a NORMAL-determine routine shown in the flow chart of FIG. 4, a program for effecting a FRONT-FAILURE-determine routine shown in the flow chart of FIG. 5, and a program for effecting a REAR-FAILURE-determine routine (not shown). The program memory 100 further stores other control programs which include a program for effecting a vehicle running speed-presume routine (not shown), a program for effecting a vehicle deceleration rate-calculate routine (not shown), and a braking pressure-regulate routine (not shown).

The ROM 74 has a NORMAL speed-difference memory 102, a FAILURE speed-difference memory 104, a failure-detecting-time memory 106, a NORMAL upper-limit table 108, a NORNAL pressure-reducing-time table 110, a FRONT-FAILURE pressure-reducing-time table 114, and a REAR-FAILURE pressure-reducing-time table 116.

Figure 9:
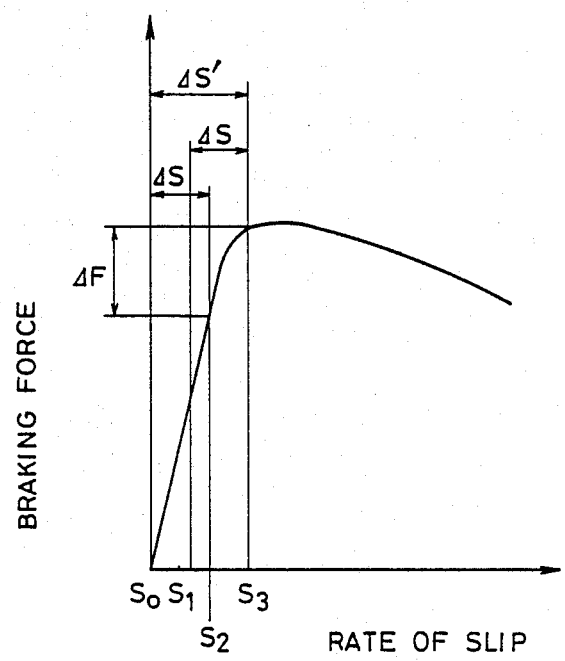
FIG. 9 is a view showing a graph illustrative of the reason why the target wheel speed is set in the event of the one-circuit failure at a speed value greater than a speed value used when both the two circuits normally function.

The NORMAL speed-difference memory 102 stores a speed difference value, which is subtracted from the presumed running speed of the vehicle (which will be described hereinafter) for the purpose of determining a target rotating speed of the wheels of the vehicle in the case where both the front and rear brake circuits normally operate. The wheels exhibit an optimum slip amount or rate with respect to the road surface when rotated at the target speed, and conseqently the vehicle is braked by a maximum braking force, i.e. at a minimum braking distance (FIG. 9). The FAILURE speed difference memory 104 stores a speed difference value which is used for the same purpose as that stored in the NORMAL memory 102, however in the case where one of the front and rear brake circuits is functionally lost. The speed difference value stored in the FAILURE speed difference memory 104 is predetermined to be greater than that stored in the NORMAL speed difference memory 102.

The failure detecting time memory 106 stores a predetermined time value To which is used as a reference for checking whether or not, within the time To after a first-time pressure-reducing operation is initiated by the control device 70 for decreasing one of the first and second braking pressures applied to the four brake cylinders 20, 26, another first-time pressure-reducing operation has been initiated for decreasing the other of the two braking pressures. If the checking is found to be negative, it is presumed by the control device 70 that one of the front and rear brake circuits which corresponds to the above-indicated other of the two braking pressures has failed or been functionally lost.

Figure 6:
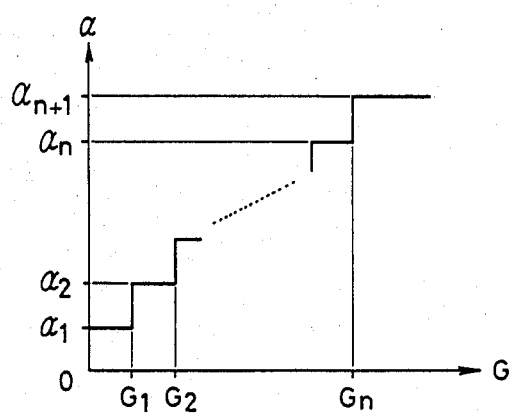
FIGS. 6, 7 and 8 are views each showing a graph illustrative of a relationship stored in a corresponding one of three memories of the computer of the control device of FIG. 2, the three memories consisting of a NORMAL upper-limit table, a NORMAL pressure-reducing-time table, and a FRONT-FAILURE pressure-reducing-time table.

The NORMAL upper limit table 108 stores upper limits $\alpha_1, \alpha_2, \ldots, \alpha_n$ of the deceleration rate of the vehicle, which are predetermined to correspond to the calculated actual deceleration rates $G_1, G_2, \ldots, G_n$ of the vehicle (which will be described hereinafter), as illustrated in FIG. 6. The NORMAL upper limit table 108 is usedized in presuming the running speed of the vehicle, when both the front and rear brake circuits are normal. In this connection, it is noted that the wheels corresponding to the failure circuit do not slip on the road surface, and accordingly the detected rotating speeds of those wheels accurately reflect the actual running speed of the vehicle. Therefore, it is unnecessary to provide the control device 70 (or ROM 74) with a FAILURE upper limit table representing a relationship between the actual vehicle deceleration rate and upper limits of the vehicle deceleration rate, for the purpose of presuming the running speed of the vehicle.

Figure 7:
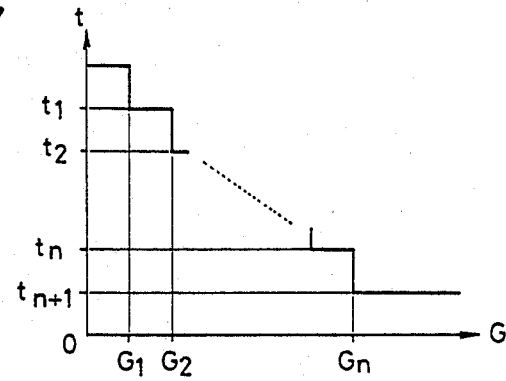
Figure 8:
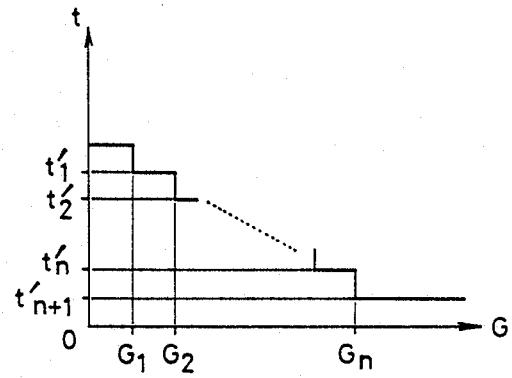

The NORMAL pressure reducing time table 110 stores pressure reducing times $t_1, t_2, \ldots, t_n$ during which the braking pressure applied to the brake cylinder 20, 26 is reduced, which times are predetermined to correspond to the calculated actual vehicle deceleration rates $G_1, G_2, \ldots, G_n$, as illustrated in FIG. 7. The FRONT-FAILURE pressure reducing time table 114 stores pressure reducing times $t'_1, t'_2, t'_n$, which are predetermined to correspond to the calculated actual vehicle deceleration rates $G_1, G_2, \ldots, G_n$, as illustrated in FIG. 8. The NORMAL table 110 is used for determining the pressure-reducing times, when the dual-circuit braking device normally operates. The FRONT-FAILURE table 114 (FIG. 8) is used for the same purpose, in the event of a failure of the front brake circuit of the dual-circuit braking device. The pressure-reducing time $t'$, stored in the FRONT-FAILURE table 114, is predetermined such that a time value $t'_n$ is smaller than a time value $t_n$ of the NORMAL table 110 in relation to a same deceleration rate $G_n$ of the vehicle. The reason of this is that, when each of tee rear wheels is brought into skidding condition with respect to the road surface, that is, when a slip rate of each rear wheel becomes excessively high, a level of the fluid pressure in the corresponding brake cylinder 26 in the event of the front-circuit failure is higher than that in the same when both the two brake circuits are normal. Meanwhile, the REAR-FAILURE table 116 (not shown) is used in the event of a failure of the rear brake circuit, and the pressure-reducing time stored therein is predetermined such that a time value is greater than a time value $t_n$ of the NORMAL table 110 in relation to a same deceleration rate $G_n$ of the vehicle, as opposed to the pressure-reducing time $t'$ of the FRONT-FAILURE table 114. The reason of this is opposed to that for the time $t'$ of the FRONT-FAILURE table 114.

The RAM 76 includes a FAILURE flag 120, a first-time flag 122, an upper-limit memory 124, and a pressure-reducing-time memory 126, the function of each of which will be described hereinafter.

There will be described an operation of the dual-circuit hydraulic anti-lock braking system of the invention constructed as described above, in which the control device 70 (CPU 72) executes the control programs stored in the program memory 100 of the ROM 74, at regular intervals of time, for example 5 msec, while the brake switch 92 senses a depression of the brake pedal 12 by the driver.

In the execution of the pressure-regulate routine and other routines (not shown), initially, the control device 70 determines three actual rotating speeds of the rear wheels, front-right wheel and front-left wheel, based on signals supplied from the rear-wheel rotating speed sensor 84 and the right and left front-wheel rotating speed sensors 88, 90, and presumes a running speed of the vehicle based on the highest one of the thus-determined three wheel rotating speeds. Then, the control device 70 determines a target wheel rotating speed, by subtracting the speed difference value stored in the NORMAL or FAILURE speed difference memory 102, 104 from the presumed vehicle running speed. The control device 70 calculates the actual deceleration rate G of the vehicle as a rate of decrease in the presumed running speed of the vehicle.

At the moment when one of the three detected wheel rotating speeds becomes lower than the target speed due to application of brake to the wheels as a result of a depression of the brake pedal 12, the control device 70 determines a deceleration rate upper limit value α and a pressure reducing time value t or t', based on the calculated actual vehicle deceleration rate G of that moment and according to the NORMAL upper limit table 108 and the NORMAL, FRONT-FAILURE or REAR-FAILURE pressure reducing time table 110, 114, 116, respectively. At that moment, the control device 70 generates, from the output port 94, a pressure-reduce signal to one of the two first valves 18, 18 and the one second directional valve 24 which corresponds to the wheel(s) in question, to reduce the fluid pressure in the corresponding brake cylinder(s) 20, 26 for the purpose of preventing the wheel(s) from exhibiting an excessively higher rate of slip (FIG. 9). After the pressure-reducing time t, t' has passed, the control device 70 generates a pressure-hold signal and then a pressure-increase signal to the valve 18, 24 in question in order to maintain and then increase the fluid pressure. Thus, the rotating speed of each wheel of the vehicle is suitably controlled by the control device 70, valves 18, 24, and other members, so that it is held at around the target speed.

The selection of the NORMAL speed difference memory 102 or the FAILURE speed difference memory 104 is performed by the control device 70 in the course of execution of the pressure-regulate routine, according to a pair of positions ON and OFF of the FAILURE flag 120 of the RAM. The FAILURE flag 120 is selectively placed in its ON and OFF positions by execution of the failure-detect subroutine shown in the flow chart of FIG. 3.

Similar to other subroutines, the failure-detect routine is executed at regular intervals of a short time, as follows: initially, step S1 is implemented by the CPU 72 to check whether or not the a first operation of above-described pressure-reducing operations has been initiated on one of the front and rear brake circuits for reducing the fluid pressure(s) in the corresponding one or two of the front and rear brake cylinders 20, 26. If the checking at step S1 is found to be negative, all the following steps are skipped and the control of the CPU 72 returns to the main routine, that is the pressure-regulate routine, whereby one-time execution of the failure-detect routine is terminated.

Conversely, if the checking at step S1 is affirmative, that is, if the first-time pressure-reducing operation has been initiated on one of the two brake circuits, step S1 is followed by step S2 to check whether or not another first-time pressure-reducing operation has been initiated on the other of the two braking circuits for decreasing the fluid pressure(s) in the corresponding one or two of the front and rear brake cylinders 20, 26. Since usually the pressure-reducing operations are not initiated concurrently on both the two brake circuits, the checking at step S2 is found to be negative. Thus, step S2 is followed by steps S3 and S4 to check whether or not the FAILURE flag 120 and the first-time flag 122 are placed in their ON position, respectively. Since these flags 120, 122 are in their OFF position after initialization of the computer 70 upon application of electric power thereto, both the checkings at steps S3 and S4 are found to be negative, whereby the control of the CPU 72 advances to step S5 to clear the timer 98 for starting measuring time from the initiation of the pressure-reducing operation on the above-indicated one brake circuit, and further to step S6 to place the first-time flag 122 in its ON position.

Subsequently, step S6 is followed by step S7 to check whether or not the time measured by the timer 98 has exceeded the failure-detecting time To stored in the memory 106. At the beginning of the operation, the checking at step S7 is seen to be negative, then the control of the CPU 72 returns to the main routine by bypassing step S8. Thus, one-time execution of the failure-detect routine is ended.

The above-described implementation of steps S1–S7 is repeated, and when the time measured by the timer 98 has exceeded the failure-detecting time To the checking at step S7 turns affirmative. In the case where the first-time flag 122 has been placed in its ON position at step S6, the checking at step S4 is found to be affirmative, and accordingly steps S5 and S6 are skipped, thereby allowing the timer 98 to keep measuring time.

However, normally, the pressure-reducing operation is initiated on the other of the two brake circuits before the time measured by the timer 98 has reached the reference time To. In the normal condition, the checking at step S2 is found to be affirmative, and step S2 is followed by steps S9 and S10 to place the first-time and FAILURE flags 122, 120 in their OFF position. While the FAILURE flag 120 is placed in its OFF position, the speed difference value stored in the NORMAL memory 102 is used for determining a target wheel rotating speed. As illustrated in the graph of FIG. 9, a braking force produced by a wheel is varied depending upon a rate of slip of the wheel. It is understood from the graph that a maximum braking force corresponds to a slip rate indicated at $S_3$. Therefore, it is preferred that the braking pressure be regulated so that the slip rate of a wheel takes the value $S_3$, i.e. is located at the position $S_3$ in the graph.

In the event of a failure of one of the front and rear brake circuits, since the failure circuit no longer establishes braking pressure, the wheels corresponding to the failure circuit are not brought into a condition in which a slip rate thereof is excessively high. Consequently, the pressure-reducing operation is not initiated on the failure circuit. In the present embodiment, if a pressure-reducing operation is initiated on one of the two brake circuits and another pressure-reducing operation is not initiated on the other of the two circuits within the failure-detecting time To after the initiation of the pressure-reducing operation on that one brake circuit, it is presumed by the computer 70 that the other brake circuit has failed. Consequently, the FAILURE speed difference memory 104 is used, in place of the NORMAL memory 102, for determining a target rotating speed of the wheels corresponding to the normally functioning brake circuit. Since the time measured by the timer 98 has exceeded the failure-detecting time To, the checking at step S1 turns affirmative, and the checking at step S7 is found to affirmative, since the time measured by the timer 98 has exceeded the failure-detecting time To. Step S7 is followed by step S8 to place the FAILURE flag 120 to be ON. While the FAILURE flag 120 is in its ON position, the speed difference value stored in the FAILURE memory 104 is used in determining a target rotating speed of the wheels in the course of execution of the pressure-regulate routine. The speed difference value stored in the FAILURE memory 104 is predetermined to be grater than that stored in the NORMAL memory 102, which is used when the dual circuit braking device is normal, and is subtracted from the presumed running speed of the vehicle for determining the target wheel rotating speed.

More specifically described, the speed difference value stored in the NORMAL memory 102 corresponds to a slip rate difference $\Delta S$ shown in the graph of FIG. 9. When the two brake circuits normally function, even the wheel which is being rotated at the highest speed of the four wheels, which speed is utilized in presuming the running speed of the vehicle as previously described, exhibits a rate of slip at the level $S_1$. Since the speed difference value stored in the NORMAL memory 102, which value corresponds to the slip rate difference $\Delta S$, is used when the two brake circuits are normal, the slip rate of each wheel of the vehicle is suitably regulated at around the value $S_3$, whereby the wheel produces a maximum braking force. On the other hand, since in the event of a failure of one of the two brake circuits the wheel exhibiting the highest rotating speed always belongs to the wheel group which corresponds to the failure circuit that no longer transmits braking pressure, the slip rate of the wheel takes a value indicated at So (that is, the wheel does not slip on the road surface). If the same speed difference value is used in the event of the one-circuit failure, as that for the case where the front and rear brake circuits normally function, the slip rate of each wheel in the event of the one-circuit failure is located at around the value $S_2$, which represents a braking force smaller by a value $\Delta F$ than the maximum braking force represented by the value $S_3$. This is the reason why the value stored in the FAILURE speed difference memory 104 is predetermined to correspond to a slip rate difference $\Delta S'$. Accordingly, in the event of a failure of one circuit, the speed difference value stored in the FAILURE memory 104 is used for determining the target wheel rotating speed, specifically, by subtracting that value from the presumed vehicle running speed. Thus, even in the case of the one-circuit failure, the braking pressure of the normal circuit is suitably regulated so that the slip rate of the wheels corresponding to the normal circuit is held at around the value $S_3$.

In this connection, it is noted that, if the checking at step S2 turns from negative to affirmative after at step S8 the FAILURE flag 120 is placed in its ON position, that is, if a first-time pressure-reducing operation has been initiated on the other brake circuit in which a failure has been detected, step S2 is followed by stes S9 and S10 to place the first-time and FAILURE flags 122, 120 in their OFF position, respectively, whereby the pressure difference value stored in the NORMAL memory 102 is used for determining the target wheel rotating speed, in place of that stored in the FAILURE speed difference memory 104. This arrangement is advantageous for the case where, although both the brake circuits are actually normal, the FAILURE flag 120 is placed in its ON position because a succeeding first-time pressure-reducing operation has not been initiated for some reason on the other circuit within the failure-detecting time To after the preceding first-time pressure reducing operation has been initiated on the one brake circuit. When the succeeding pressure-reducing operation is initiated a little time after the time To has passed, the FAILURE flag 120 is changed from its ON position to its OFF position at step S10.

Figure 4:
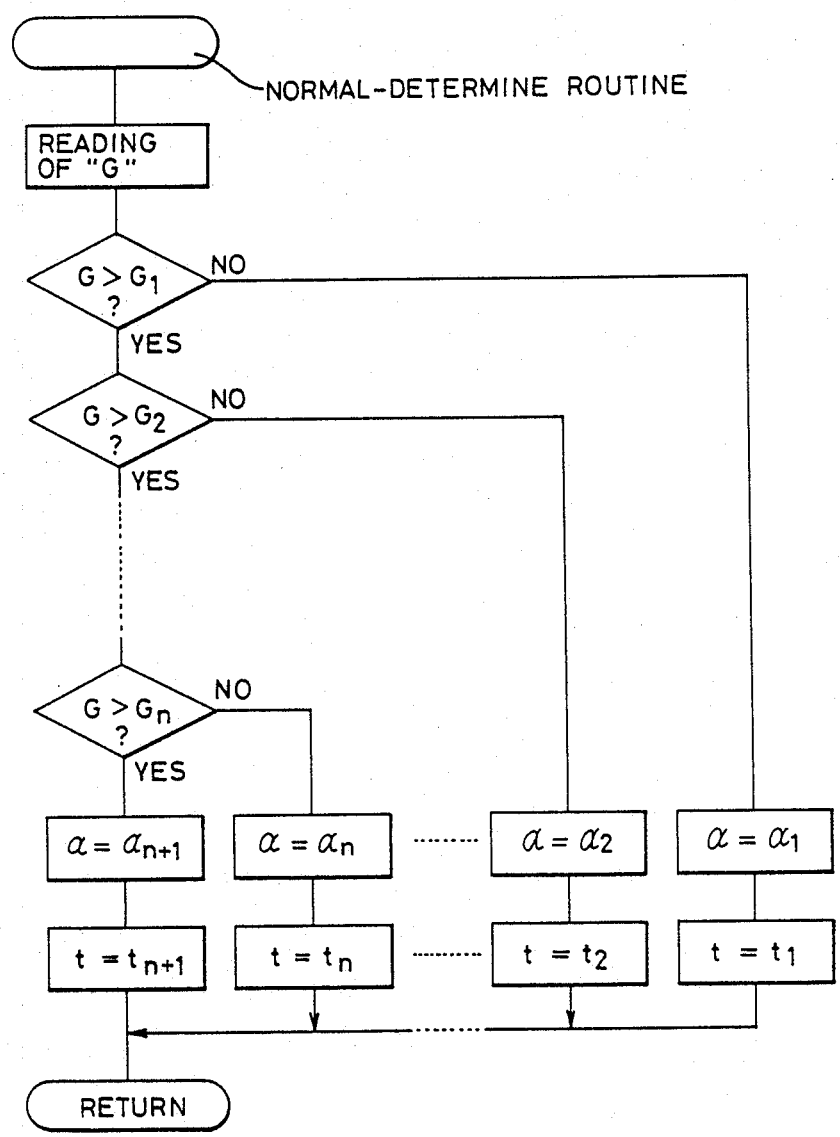
FIGS. 4 and 5 are flow charts representing a NORMAL-determine routine and a FRONT-FAILURE-determine routine effected for determining a vehicle deceleration rate upper limit and a pressure-reducing time which are used for regulating the braking pressure when the two brake circuits are normal, and for determining a pressure-reducing-time which is utilized for the same purpose in the event of the front-circuit failure, respectively, each flow chart constituting a part of the control program used in the braking system of FIG. 1.
Figure 5:
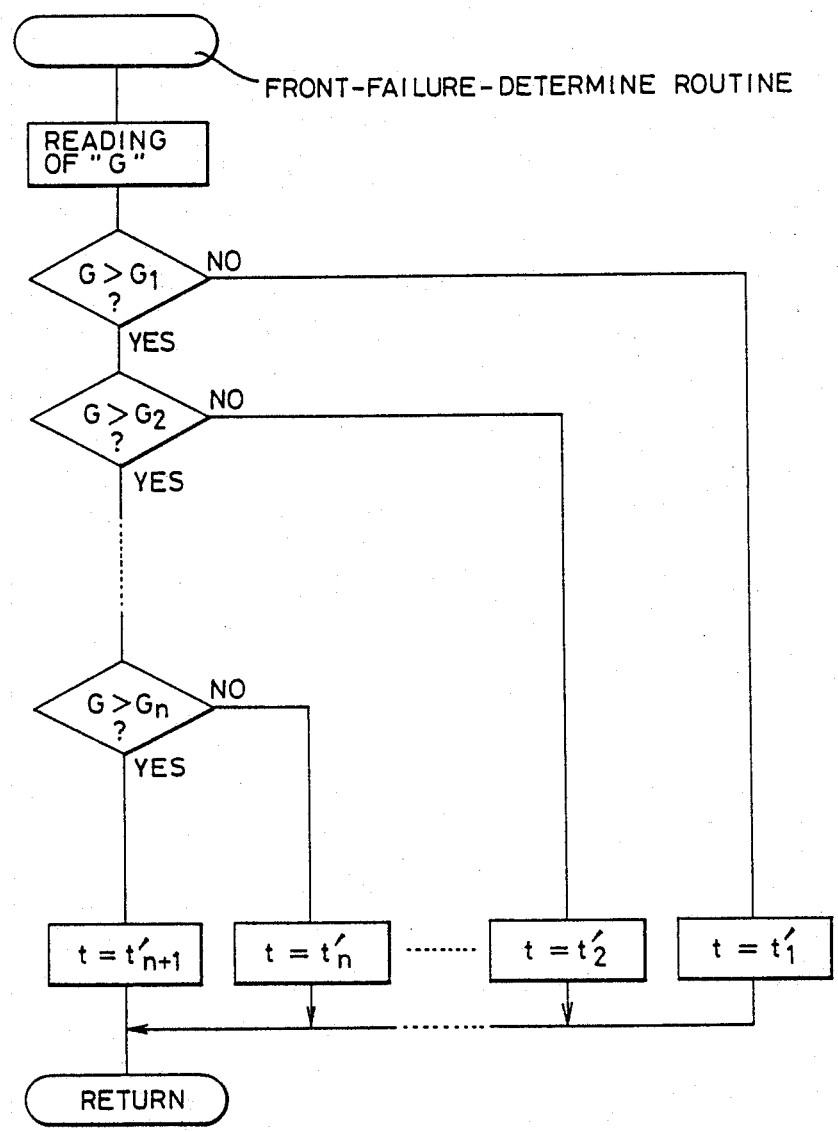

While the FAILURE flag 120 is in its OFF position, the NORMAL-determine routine shown in FIG. 4 is repeatedly executed at regular intervals of a short time. On the other hand, while the FAILURE flag 120 is in its ON position, the FRONT-FAILURE-determine routine (FIG. 5) or the REAR-FAILURE-determine routine (not shown) is repatedly executed at regular intervals of a short time. Thus, while the FAILURE flag 120 is in the OFF position, an appropriate upper limit $\alpha$ and an appropriate pressure-reducing time t are determined based on the calculated actual vehicle deceleration rate G, by checking whether or not the actual deceleration rate G is higher than each of the values G1, G2, ..., or Gn (FIG. 4). Meanwhile, while the FAILURE flag 120 is in the ON position, one of the FRONT-FAILURE pressure-reducing time table 114 and the REAR-FAILURE pressure-reducing time table 116 is selectively used, correspondingly to the failure one of the front and rear circuits, for determining a pressure-reducing time which corresponds to the calculated actual vehicle deceleration rate G.

Figure 10:
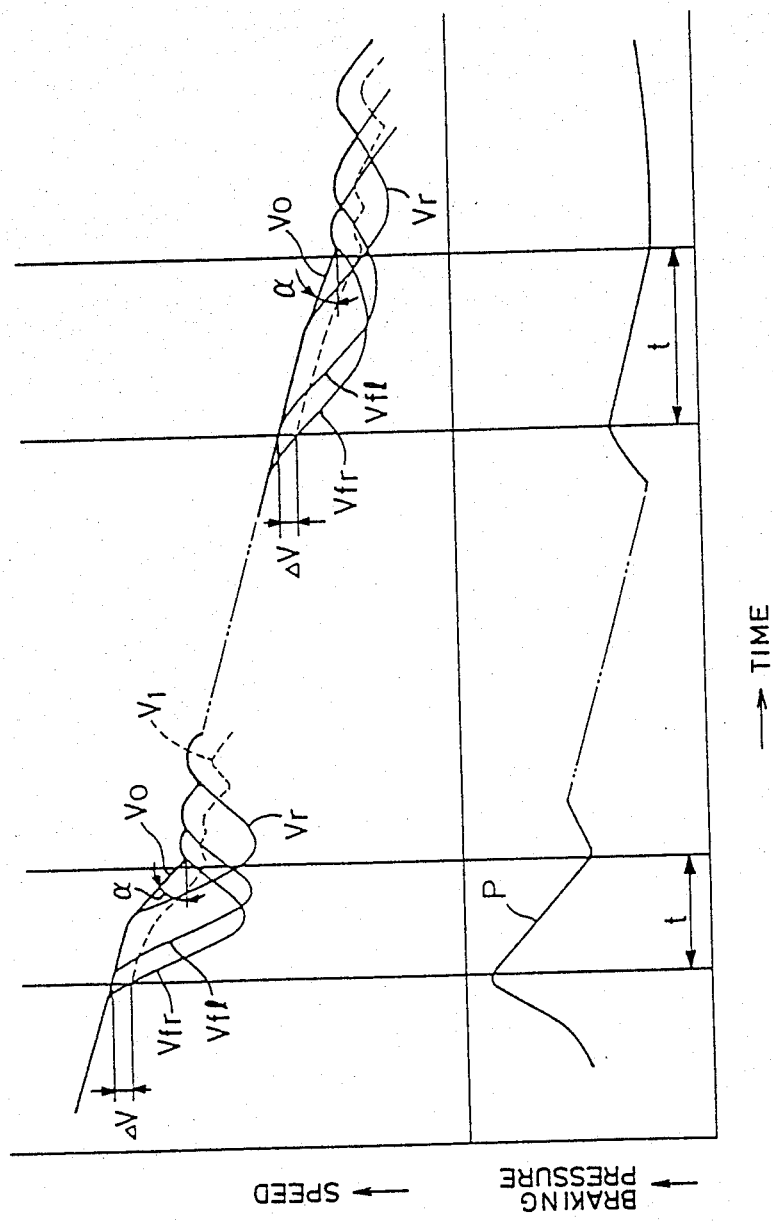
FIG. 10 is a view showing a graph illustrative of a relationship among the detected rotating speeds of the wheels, the presumed running speed of the vehicle and the braking pressure, when the two brake circuits of the braking system of FIG. 1 normally function.

Referring next to FIG. 10, there will be described the pressure-reducing operation for reducing the fluid pressures in the four brake cylinders 20, 26 when the two circuits are normal. Reference characters used in FIG. 10 designate the following:

Vfr: Rotating speed of the front-right wheel
Vfl: Rotating speed of the front-left wheel
Vr: Average rotating speed of the rear-right and rear-left wheels
Vo: Presumed running speed of the vehicle (represented by the highest one of the detected rotating speeds Vfr, Vfl and Vr)
$\alpha$: Upper limit of the vehicle deceleration rate
t: Pressure reducing time
P: Braking pressure While at least two of the speeds Vfr, Vfl and Vr are equal to each other, the control device (computer) 70 presumes that the vehicle running speed is represented by those speeds. In the example of FIG. 10, since the two circuits are normal, that is, since the FAILURE flag 120 is placed in its OFF state, the control device 70 determines a target wheel rotating speed V1, illustrated in broken line in FIG. 10, by subtracting the speed difference value $\Delta V$ stored in the NORMAL speed difference memory 102 from a presumed vehicle running speed Vo. On the other hand, in the event of a failure of one of the two brake circuits, that is, if the FAILURE flag 120 is set ON, a target wheel rotating speed (V1', not shown) is obtained by subtracting the speed difference value (ΔV', not shown) stored in the FAILURE memory 104 from a presumed vehilce running speed Vo. The control device 70 repeatedly compares each of the rotating speeds Vfr, Vfl and Vr with the thus-determined target wheel rotating speed V1, and at the moment when one of the speeds Vrf, Vfl and Vr becomes lower than the target speed V1, the control device 70 generates a pressure-reduce signal to the corresponding solenoid-operated valve 18, 18, 24 to reduce the fluid pressure of the brake fluid in the corresponding brake cylinder(s) 20, 26, thereby causing the rotating speed of the wheel to be increased and preventing the wheel from slipping at an excessively high rate or skidding on the road surface.

In the example of FIG. 10, the speed Vfr first of all becomes lower than the target wheel speed V1, and the computer 70 executes the NORMAL-determine routine shown in FIG. 4 to determine a deceleration rate upper limit $\alpha$ and a pressure-reducing time t based on the calculated actual vehicle deceleration rate G of that moment and according to the NORMAL tables 108 and 110 shown in FIGS. 6 and 7, respectively. Meanwhile, in the event of the one-circuit failure, the computer 70 implements the FRONT-FAILURE-determine routine (FIG. 5) or the REAR-FAILURE-determine routine (not shown) for determining a pressure-reducing time t' corresponding to the calculated deceleration rate G of that moment, according to the FRONT-FAILURE or REAR-FAILURE table 114, 116, respectively. The thus determined values $\alpha$ and t are stored in the upper limit memory 124 and pressure-reducing-time memory 126, respectively. The same steps are subsequently implemented when the speed Vfl or Vr becomes lower than the target wheel speed V1, and the determined upper limit $\alpha$ and pressure-reducing-time t are stored in the upper-limit memory 124 and pressure-reducing-time memory 126, respectively. In this connection, it is noted that the newly determined upper limit $\alpha$ replaces the previously determined upper limit $\alpha$ already stored in the memory 124, whereby the data stored in the memroy 124 is updated. On the other hand, the pressure-reducing-time memory 126 have memory sections assigned for storing the times t for the three speeds Vfr, Vfl and Vr.

When the rotating speed Vfl of the front left wheel becomes lower than the rotating speed Vr of the rear wheels during the above indicated operation, the speed Vr correspondingly becomes the highest of the three speeds Vfr, Vrl and Vr, and it is presumed that the vehicle running speed Vo is represented by the speed Vr. Thereafter, the control device 70 repeatedly calculates the actual vehicle deceleation rate G based on the speed Vr, namely, presumed vehicle running speed Vo. When the calculated deceleration rate G of the rear wheels exceeds the upper limit presently stored in the upper-limit memory 124 (i.e., upper limit which was stored when the speed Vfl of the front left wheel had become lower than the target wheel speed V1), the control device 70 fixes the vehicle deceleration rate G at the upper limit stored in the memory 124, and repeats to presume the vehicle running speed Vo, based on the fixed upper limit. Therefore, the presumed running speed Vo of the vehicle is represented by a straight line which has a gradient or slope equal to the fixed upper limit $\alpha$, as indicated in FIG. 10. It is assumed that the presumed vehicle speed Vo is lowered comparatively rapidly as indicated in an upper-left portion of FIG. 10, when the fixed upper limit $\alpha$ is relatively high, while the presumed vehicle speed Vo is lowered comparatively slowly as indicated in a upper-right portion of FIG. 10, when the fixed upper limit $\alpha$ is relatively low. As soon as the computer 70 had determined to fix the deceleration rate G at the above-indicated upper limit $\alpha$, the CPU 72 determines a pressure-reducing tim t during which the fluid pressures in the rear brake cylinders 26, 26 are reduced, such that the time t is equal to that for the front left wheel. In the instant dual-circuit braking device, the first and second directional valves 18, 24 are adapted to reduce the first and second braking pressures of the front and rear brake circuits by a same amount during a same length of time, irrespective of whether or not there is a difference between the two braking pressures (usually, the second braking pressure is lower than the first braking pressure due to provision of the proportional valve 14). Accordingly, the same pressure-reducing time t can be used for reducing the first and second braking pressures by the same amount. Where the valves (18, 24) are not constructed as indicated above, different pressure-reducing times are used for reducing the first and second braking pressures by a same amount.

Meanwhile, the computer 70 measures a duration of time from generation of a pressure-reduce signal to the valve 18, 24 in question. When the measured duration becomes equal to the corresponding one of the pressure-reducing times t stored in the memory 126, the computer 70 generates a pressure-increase signal (or a pressure-hold signal) to the valve 18, 24. As indicated in a lower-left portion of FIG. 10, the braking pressure P (fuid pressure in the front-right brake cylinder 20) abruptly or rapidly drops if the braking pressure at the time of generation of the presure-reduce signal is comparatively high. The comparatively high braking pressure P permits a comparatively high rate of deceleration of the vehicle. This is the reason why the pressure-reducing time t, t' is shortened with an increase in the braking pressure, i.e., with an increase in the calculated actual deceleration rate G, according to the relationship shown in FIG. 7 and the relationship shown in FIG. 8 for the case of the front-circuit failure. The pressure-increase signal is generated after the braking pressure P has been lowered by a sufficient amount during the first pressure-reducing time t, t' Conversely, if the braking pressure P is comparatively low at the time of generation of the pressure-reduce signal, a relatively long time t, t' is selected according to the relationship shown in FIG. 7 and the relationship (now shown) for the event of the rear-circuit failure. Consequently, the braking pressure P is lowered by a sufficient amount prior to the generation of the pressure-increase signal, though the pressure reducing rate is relatively low as indicated in a lower-right portion of FIG. 10.

Subsequently, one of the three rotating speeds Vfr, Vfl and Vr, in this example of FIG. 10, the speed Vfr of the front right wheel exceeds the presumed vehicle speed Vo, and the computer 70 presumes that the vehicle running speed is represented by the speed Vfr. When the speed Vfl of the front left wheel subsequently exceeds the speed Vfr, then the speed Vfl is presumed to represent the vehicle running speed Vo. The control device 70 generates a next cycle of a pressure-reduce, a pressure-hold and a pressure-increase signal to the valve 18, 24 to regulate the first or second braking pressure so as to hold the rotating speed of the wheel(s) in question at the target speed.

As described above, the CPU 72 repeatedly presumes the running speed Vo of the vehicle, and compares the value of each speed Vfr, Vfl, Vr with the presumed vehicle speed Vo, in order to control the corresponding directional valve 18, 24 so as to avoid an excessive amount of slip of the corresponding wheel(s). Thus, since the upper limit o of the deceleration rate of the vehicle is determined to correspond to the calculated actual vehicle deceleration rate G, the upper limit $\alpha$ can be set close to the actual deceleration rate of the vehicle, and consequently the actual vehicle running speed Vo can be presumed with accordingly improved accuracy, whereby the instant dual-circuit braking device can be precisely controlled.

Further, the pressure-reducing time t, t' between the generation of the pressure-reduce signal supplied to each valve 18, 24 and the generation of the pressure-increase signal (or pressure-hold signal), is suitably determined to correspond to the actual deceleration rate G of the vehicle, whereby the fluid pressure in each brake cylinder 20, 26 can be lowered by an optimum amount. Thus, the instant arrangement eliminates excessive or insufficient amounts of drop of the braking pressures, which result in an increased braking distance of the vehicle, or a lowered running stability of the vehicle.

In the instant embodiment, different pressure-reducing times t and t' are used between when the two circuits are normal and when one of the two circuits is functionally lost, whereby even in the event of the one-circuit failure the braking pressure is suitably regulated for improved anti-lock braking action.

It is understood from the foregoing description that the present embodiment incorporates failure detecting means for detecting a failure of each of the two brake circuits of the dual-circuit hydraulic braking device, and time setting means for determining the pressure-regulating time during which the braking pressure is regulated, at a time value, when the one-circuit failure is detected by the failure detecting means, such that the time value is different from a time value of the pressure-reducing time used when both the two brake circuits normally function. The failure detecting means is constituted by a portion of the control device (computer) 70 which is adapted to execute the failure-detect routine, such as the timer 72 and failure-detecting-time memory 106, while the time setting means is constituted by a portion of the control device 70 which is adapted to execute the NORMAL-determine, FRONT-FAILURE-determine and REAR-FAILURE-determine routines, the NORMAL, FRONT-FAILURE and REAR-FAILURE pressure-reducing-time tables 110, 114, 116 and the pressure-reducing-time memory 126. Further, the rear-wheel speed sensor 84, and front-left and front-right wheel speed sensors 88, 90 cooperate to constitute wheel rotating condition detecting means, while vehicle running condition detecting means is constituted by a portion of the control device 70 which is adapted to execute the program for presuming the vehicle running speed based on the highest one of the detected wheel rotating speeds and the program for calculating the vehicle deceleration rate based on the presumed vehicle running speed. Moreover, a portion of the control device 70 which is adapted to execute the pressure-regulate routine, the first and second valves 18, 24, etc. cooperate to constitute a pressure regulating device of the instant braking system.

In the illustrated embodiment, the failure detecting means is constituted by software, which contributes to holding manufacturing cost of the system as low as possible. However, the failure detecting means may be otherwise embodied, for example by hardware. For instance, a pair of pressure sensors 152, 154 shown in two-dot lines in FIG. 1 may be provided for detecting the first and second braking pressures transmitted by the front and rear brake circuits, respectively, and monitoring a pressure difference between the two pressures before those pressures are regulated by the pressure regulating device. If, in this alternative arrangement, the pressure difference becomes greater than a predetermined value, that means occurrence of a failure of one of the two brake circuits. In yet another arrangement, a pressure sensor 156 may be provided bridging the front and rear brake circuits to detect a pressure difference therebetween.

Meanwhile, it is possible to detect the deceleration rate G of the vehicle using an accelerometer fixed to the body of the vehicle, and determine the vehicle acceleration upper limit $\alpha$ and pressure-reducing time t, t' based on the thus detected deceleration rate G. In this example, the accelerometer serves as the vehicle running condition detecting means.

While in the illustrated embodiment the target wheel rotating speed is used as a reference, such that when one of the detected wheel rotating speeds of the wheels becomes lower than the reference speed the computer 70 generates a pressure-reduce signal indicative of reducing the fluid pressure in the corresponding brake cylinder. However, it is possible to employ another target wheel rotating speed which is used as a reference such that when one of the wheel rotating speeds of the wheels exceeds the reference speed the computer generates a pressure-increase signal indicative of increasing the fluid pressure in the corresponding braking cylinder.

Moreover, while the illustrated hydraulic braking device is of the front/rear dual-circuit type and is employed in the four-wheel automotive vehicle, it is possible to apply the principle of the invention to other types of dual-circuit hydraulic braking devices, such as the "diagonal-piping" dual-circuit type. A four-wheel vehicle, which have incorporated the diagonal-type dual-circuit braking device, has a first wheel group consisting of a front-right wheel and a rear-left wheel and a second wheel group consisting of a front-left wheel and a rear-right wheel and a first and second hydraulically independent brake circuit for applying a first and a second braking pressure to the brake cylinders associated with the wheels of the first and second wheel groups. In this example, too, the pressure-reducing time t' used for regulating the fluid pressure in the normal or live front brake cylinder whose associated front wheel has come to exhibit an excessively high slip rate, in the event of one-circuit failure, is predetermined to be longer than the pressure-reducing time t used for the same purpose when the two circuits are normal, in relation to a same actual vehicle deceleration rate G, while the pressure-reducing time t' used for regulating the fluid pressure in the normal rear brake cylinder whose associated rear wheel has come to exhibit an excessively high slip rate, in that event, is predetermined to be shorter than the time t in relation to a same rate G.

The principle of the invention may be applied to an automotive bicycle which has one front wheel and one rear wheel which are subject to a pair of independent braking pressures transmitted by a pair of brake circuits of the dual-circuit braking device thereof, respectively.

It will be understood that the present invention may be embodied with various other changes, modifications and improvements which may occur to those skilled in the art. For example, modifications may be made so as to provide other pressure regulating devices and/or other control programs.

What is claimed is:

1. A dual-circuit hydraulic anti-lock braking system for an automotive vehicle having a first wheel group including at least one wheel and a second wheel group including at least one wheel different from the at least one wheel of the first wheel group, comprising:
   a dual-circuit hydraulic braking device including a first and a second brake circuit which are hydraulically independent of each other,
   said first brake circuit comprising (a) a first brake-cylinder group including at least one brake cylinder for applying brake to a corresponding wheel of said first wheel group, (b) a first pressure source for producing a first braking pressure, and (c) a first fluid-passage group including at least one fluid passage for transmitting said first braking pressure from said first pressure source to a corresponding brake cylinder of said first brake-cylinder group,
   said second brake circuit comprising (d) a second brake-cylinder group including at least one brake cylinder for applying brake to a corresponding wheel of said second wheel group, (e) a second pressure source for producing a second braking pressure which is hydraulically independent of said first braking pressure, and (f) a second fluid-passage group including at least one fluid passage for transmitting said second braking pressure from said second pressure source to a corresponding brake cylinder of said second brake-cylinder group;
   wheel rotating condition detecting means for detecting a rotating condition of at least one wheel of each of said first and second wheel groups;
   vehicle running condition detecting means for detecting a running condition of said automotive vehicle;
   braking pressure regulating means for regulating, when the detected rotating condition of said at least one wheel of each of said first and second wheel groups is brought into a predetermined relationship with the detected running condition of said automotive vehicle, each of said first and second braking pressures to apply the regulated pressure to one of said brake cylinders corresponding to the wheel whose detected rotating condition is brought into said predetermined relationship, said braking pressure regulating means conducting at least one of pressure-increasing and pressure-decreasing operations for a duration of time for regulating said each braking pressure;
   failure detecting means for detecting that each of said first and second hydraulic brake circuits has failed; and
   time setting means for determining said duration of time at a first duration value when the failure of any one of the first and second brake circuits is not detected by said failure detecting means, and determining said duration of time at a second duration value different from said first duration value when said failure is detected.

2. The anti-lock braking system as recited in claim 1, wherein said failure detecting means comprises
   timer means for measuring a time lapse from initiation of a preceding first-time pressure-decreasing operation of said braking pressure regulating means for decreasing one of said first and second braking pressures; and
   judging means for checking, based on said time lapse measured by said timer means, whether or not said braking pressure regulating means has initiated a succeeding first-time pressure-decreasing operation for decreasing the other of said first and second braking pressures, within a predetermined period of time after said initiation of said preceding first-time pressure-decreasing operation,
   said judging means judging that one of said first and second brake circuits which corresponds to said other of the first and second braking pressures has failed, if the checking is found to be negative.

3. The anti-lock braking system as recited in claim 2, wherein said time setting means restores said duration of time from said second duration value to said first duration value, when said succeeding first-time pressure-decreasing operation has been initiated by said braking pressure regulating means, even after said judging means has judged that said one of the first and second brake circuits has failed.

4. The anti-lock braking system as recited in claim 1, wherein the wheels of said first and second wheel groups include at least one front wheel and at least one rear wheel, said time setting means determining said second duration value, in the case where the detected rotating condition of said at least one front wheel is brought into said predetermined relationship, such that said second duration value is larger than said first duration value, and, in the case where the detected rotating condition of said at least one rear wheel is brought into said predetermined relationship, such that said second duration value is smaller than said first duration value.

5. The anti-lock braking system as recited in claim 1, wherein said wheel rotating condition detecting means comprises wheel rotating speed detecting means for detecting a rotating speed of the at least one wheel of each of said first and second wheel groups, said vehicle running condition detecting means comprising vehicle running speed presuming means for presuming that said running speed of the automotive vehicle is represented by a highest one of the wheel rotating speeds detected by said wheel rotating speed detecting means, said predetermined relationship being that the detected rotating speed of the at least one wheel of each of said first and second wheel groups becomes lower than the presumed running speed of said automotive vehicle by a preset speed difference.

6. The anti-lock braking system as recited in claim 5, further comprising speed difference setting means for determining said speed difference at a first value when the failure of any one of the first and second brake circuits is not detected by said failure detecting means, and determining said speed difference at a second value greater than said first value when said failure is detected.

7. The anti-lock braking system as recited in claim 5, wherein said braking pressure regulating means conducts said pressure-decreasing operation for decreasing each of said first and second braking pressures for said duration of time.

8. The anti-lock braking system as recited in claim 5, wherein said vehicle running condition detecting means further comprises calculator means for calculating a deceleration rate of said presumed running speed of the automotive vehicle.

9. The anti-lock braking apparatus as recited in claim 8, wherein said time setting means comprises a first pressure-reducing-time table representing a relationship in which a plurality of duration values indicative of said first duration value correspond to a plurality of successive ranges of the calculated deceleration rate of said automotive vehicle, and a second pressure-reducing-time table representing a relationship in which a plurality of duration values indicative of said second duration value correspond to a plurality of successive ranges of the calculated deceleration rate of said automotive vehicle, said time setting means determining said duration of time according to said first pressure-reducing-time table when the failure of any one of the first and second hydraulic brake circuits is not detected by said failure detecting means, and determining said duration of time according to said second pressure-reducing-time table when said failure is detected.

10. The anti-lock braking system as recited in claim 1, wherein said failure detecting means comprises pressure difference detecting means for detecting a pressure difference between said first and second braking pressures before the first and second braking pressures are regulated by said braking pressure regulating means, and judging means for checking whether or not the detected pressure difference has exceeded a predetermined pressure difference value, said judging means judging that one of said first and second hydraulic brake circuits has failed, if the checking is found to be affirmative.

* * * * *